(No Model.)
R. A. SMITH.
CAR COUPLING.
No. 507,762. Patented Oct. 31, 1893.
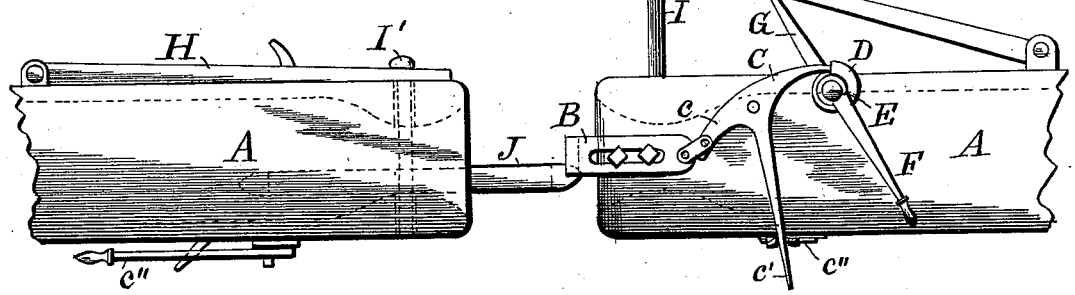
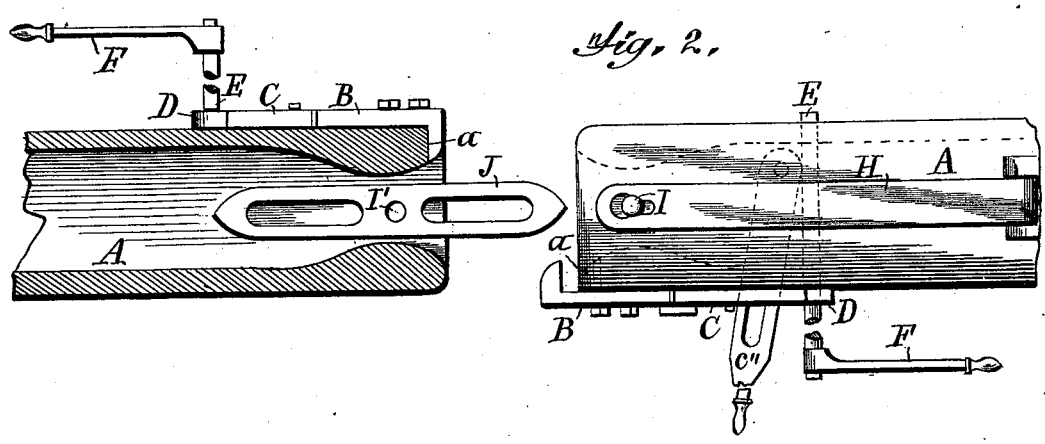
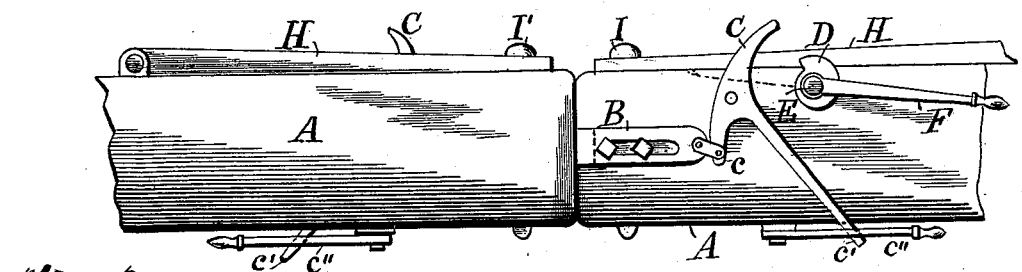
Witnesses
N. W. Johnson,
Mark W. Dewey
Inventor
Ransom A. Smith
by C. H. Duell
his Attorney

UNITED STATES PATENT OFFICE.

RANSOM A. SMITH, OF WASHINGTON MILLS, NEW YORK, ASSIGNOR OF ONE-HALF TO WILLIAM D. LEWIS, OF SAME PLACE.

CAR-COUPLING.

SPECIFICATION forming part of Letters Patent No. 507,762, dated October 31, 1893.

Application filed May 6, 1893. Serial No. 473,223. (No model.)

*To all whom it may concern:*

Be it known that I, RANSOM A. SMITH, of Washington Mills, in the county of Oneida, in the State of New York, have invented new and useful Improvements in Car-Couplers, of which the following, taken in connection with the accompanying drawings, is a full, clear, and exact description.

My invention relates to that class of car-couplers which perform the operation of coupling cars together automatically with the movement of one car in contact with another and which may be uncoupled by the operator without placing himself between the cars.

Heretofore, the coupling has been done by the link itself coming into contact with a part to be operated, or the bumper coming in contact directly with a cam, both of which are not positive in their action or durable. Also with these devices the old form of link was used which dropped at its free end so that it did not enter the opposite drawhead easily.

The object of my invention is to couple and uncouple cars with simple yet positive acting devices and with as little friction as possible.

To this end my invention consists in the combination of a draw-head, a sliding bar secured to one side of the draw-head, a pawl in contact with and operated by the sliding bar, a ratchet engaging the pawl, an arm secured to the shaft of the ratchet, a pivoted bar or a spring on the upper side of the draw-head and adapted to be raised and lowered by the movement of the said arm, and a pin held upon the free end of the pivoted bar and adapted to enter the draw-head; and my invention consists also in the combination of a draw-head, a pin passing through said draw-head, and a reversible balanced link pivoted at its center upon said pin.

In the drawings, Figure 1 shows a side elevation of two draw-heads equipped with my invention separated and in position to be coupled together. Fig. 2 is a plan view of the same, and Fig. 3 shows a side elevation of the draw-heads after they have come together or after the coupling operation has been effected.

In the drawings, A—A— are the draw-heads or bumpers. Upon one side of the draw-heads is secured a sliding bar —B— with one end bent around the end of the bumper and lying in a recess —a— therein so that it will not project beyond the end of the bumper when depressed by the opposite bumper. Said sliding bar may be secured to the draw-head to slide thereon in any suitable manner as by a couple of bolts passing through a slot in the bar and entering the draw-head. Back of the bar —B— and somewhat higher than the bar is pivoted a pawl —C— having an arm —c— bearing against the rear end of the bar —B—, or connected with the bar in any suitable manner so that when the sliding bar is depressed it will move the arm —c— and pawl on its pivot. The pawl —C— has another arm —c'— extending downward that acts in conjuction with a lever —c''— pivoted to the under side of the draw-head, not only to keep the pawl —C— in the ratchet, but to move the end of the bar —B— beyond the end of the bumper when the ratchet is turned to allow the pawl to drop therein.

D— is the ratchet engaging the pawl and is secured near one end of a shaft —E— pivoted in the draw-head close to the top side thereof and extending horizontally across the same. On the end of the shaft is a lever —F— by which the shaft may be rotated. An arm —G— is secured to the shaft —E— in the middle of the draw-head and directly beneath a bar —H— pivoted to the draw-head and holding the coupling pin —I— by its free end. When the shaft —E— is rotated by means of the lever —F— so as to allow the pawl to drop into the ratchet the free end of the arm —G— raises the bar —H—, and the pin with it so that a link can enter the draw-head. This is the position of the parts before the coupling operation. When the opposite draw-head or bumper comes in contact with the sliding bar —B— to depress it within the recess in its bumper, the pawl —C— is raised out of engagement with the ratchet which allows the shaft —E— to rotate, by the pressure of the bar —H—, and the arm —G— and bar —H— to lower and the pin to drop and enter the draw-head and the link inserted therein.

J— is the coupling link. This link is preferably made somewhat longer than an ordinary link and provided with pointed ends. The link has its sides connected together in the middle or midway between its ends and has a hole through its center for the pin —I'— to pass through. The said link is therefore, when in position, pivoted at its center on the pin —I'— and is not only reversible, but balanced on its center so that it will maintain a horizontal position and enter the opposite bumper easily and without injury to either the link or its pin, and needs no one to guide it into the bumper.

Having described my invention, what I claim as new, and desire to secure by Letters Patent, is—

1. The combination of a draw-head, a sliding bar secured to one side of the draw-head, a pawl in contact with and operated by the sliding bar, a ratchet engaging the pawl, an arm secured to the shaft of the ratchet, a pivoted bar on the upper side of the draw-head and adapted to be raised and lowered by the movement of the said arm, and a pin held upon the free end of the pivoted bar and adapted to enter the draw-head, substantially as described.

2. The combination of a draw-head, a sliding bar secured to one side of the draw-head, a pawl in contact with and operated by the sliding bar, a ratchet engaging the pawl, an arm secured to the shaft of the ratchet, a pivoted bar on the upper side of the draw-head and adapted to be raised and lowered by the movement of the said arm, and a pin held upon the free end of the pivoted bar and adapted to enter the draw-head, with a second draw-head, a balanced link in the latter draw-head, and a pin passing through the latter draw-head and link, substantially as described.

3. The combination of a draw-head, a sliding bar secured to one side of the draw-head, a pawl in contact with and operated by the sliding bar, a ratchet engaging the pawl, an arm secured to the shaft of the ratchet, a pivoted bar on the upper side of the draw-head and adapted to be raised and lowered by the movement of the said arm, and a pin held upon the free end of the pivoted bar and adapted to enter the draw-head, with a second draw-head, a link having its sides connected together midway between its ends, a hole through its central portion and a pin passing through the said hole and draw-head, substantially as described.

4. The combination of a draw-head, having but one recess for a link a pin passing through the top and bottom of said draw-head, and a link pivoted at its center on said pin, substantially as described.

5. The combination of a draw-head, having but one recess for a link a pin passing through the top and bottom of said draw-head, and a reversible balanced link pivoted at its center upon said pin, substantially as described.

In testimony whereof I have hereunto signed my name this 29th day of April, 1893.

RANSOM A. SMITH. [L. S.]

Witnesses:
 MARK W. DEWEY,
 H. M. SEAMANS.